March 13, 1956 R. I. STROUGH 2,737,776
TORQUE RESPONSIVE CONTROL FOR AN EMERGENCY FUEL SYSTEM
Filed March 21, 1952
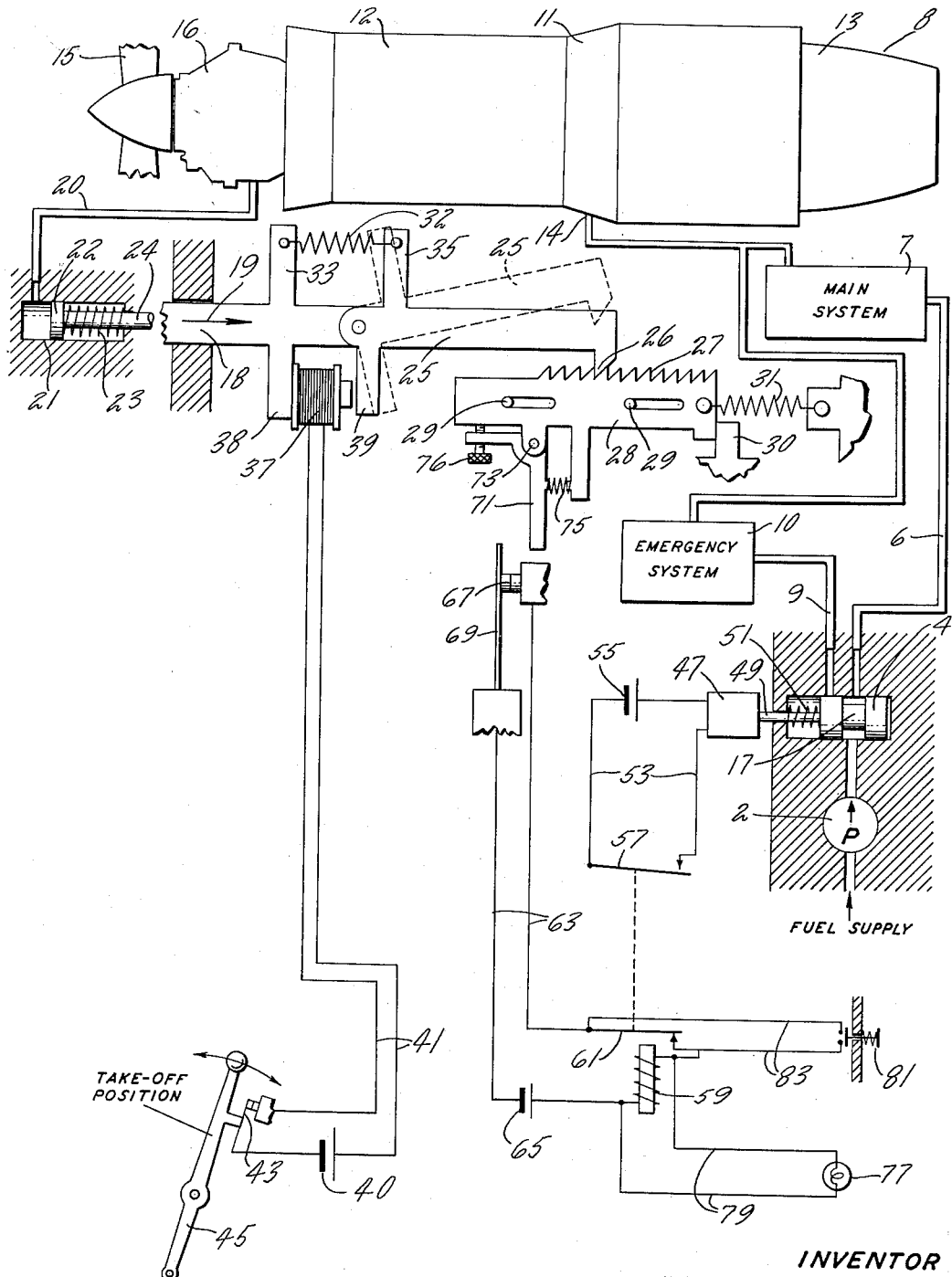
INVENTOR
ROBERT I. STROUGH
BY Charles A. Warren
ATTORNEY

United States Patent Office 2,737,776
Patented Mar. 13, 1956

2,737,776

TORQUE RESPONSIVE CONTROL FOR AN EMERGENCY FUEL SYSTEM

Robert I. Strough, East Hartford, Conn., assignor to United Aircraft Corporation, East Hartford, Conn., a corporation of Delaware Application March 21, 1952, Serial No. 277,886

10 Claims. (Cl. 60—39.28)

The present invention relates to an arrangement for transferring from the primary fuel system of a power plant to an emergency fuel system in the event of failure of the primary system.

One feature of the invention is an arrangement by which the control will automatically switch from the primary fuel system to the emergency system in the event of a substantial decrease in torque, which would result from failure of the primary fuel system. The device is particularly adapted for use under conditions of maximum power, as for example, during take-off, where, if the primary fuel system should fail or not function properly, the decrease in power might prevent a successful take-off and result in a crash.

Another feature of the invention is an arrangement for making operative the switch-over control only during selected conditions of engine operation, as for example, during maximum power operation or during take-off. To this end, the invention incorporates a device rendered operative by the positioning of the control lever in a predeterimned power setting or in a position for take-off with this device functioning to arm or make operative the switch-over control so that it will function in the event of a decrease in torque.

Other objects and advantages will be apparent from the specification and claims, and from the accompanying drawing which illustrates an embodiment of the invention.

The single figure is a diagrammatic view of the switch-over control.

With reference to the drawing, the fuel supply is from a source, not shown, through a pump 2 past a solenoid control valve 4 to a primary conduit 6 for the primary or main fuel system 7 which controls the fuel supplied to the power plant 8, and another conduit 9 for the emergency system 10 also arranged for controlling the fuel supply to the power plant. It will be understood that any of the well known primary and emergency systems may be utilized and that the invention is directed not to the systems but to an arrangement for switching from the main system to the emergency system in the event of a power failure or a reduction in torque while the primary fuel system is operating.

The power plant shown is a gas turbine including a combustor 11 between the compressor 12 and turbine 13, the fuel being delivered through a pipe 14 to nozzles, not shown, for injection into the combustor. The turbine drives the compressor and may also drive a propeller 15 through a reduction gear 16.

The solenoid operated valve 4 is normally in a position to establish fuel flow from the pump 2 directly into the primary system 6 around a groove 17 in said valve. In this position of the valve the conduit 9 for the emergency system is closed, as shown. When the switch-over control operates the valve 4 is shifted to close off primary conduit 6 and to establish flow from the supply pump to the emergency conduit 9 around the groove 17. The primary system may be any suitable control system such as for example that disclosed in the Torell application Serial No. 84,303 filed March 30, 1949, now Patent No. 2,708,826 issued May 24, 1955. Similarly the emergency system may be any suitable control system, but would generally be a simple system in which the flow is controlled primarily as a function of turbine speed.

The switch-over control includes a bar 18 the movement of which is responsive to the torque developed by the power plant. Thus, with increasing torque the bar 18 moves in the direction of the arrow 19 and with decreasing torque the bar moves in the opposite direction. The mechanism by which this bar is actuated may be any of the well known torque responsive mechanisms, as for example, the mechanism described in the Newcomb Patent No. 2,444,363, which shows a device for measuring power plant torque, or the torque delivered to the propeller.

The torquemeter of this patent indicates torque variations by variations of pressure in a control fluid. Such variations may be transmitted through duct 20 to the end of a cylinder 21 having a piston 22 therein. A spring 23 urges the piston to the left and the pressure increases in the control fluid resulting from torque increases urge the piston 22 and its associated rod 24, which may be connected to bar 18, to the right.

The bar 18 carries a pivoted lever 25 which is held, when the switch-over control is operative, in the full-line position shown thereby holding a pawl 26 on the lever in engagement with a ratchet 27 on a slide 28. This slide is guided for linear movement by pins 29 and resiliently held against a stop 30 by a spring 31.

A coil spring 32 extending between an arm 33 on the bar 18 and an arm 35 on the lever 25 holds the pawl in the inoperative dotted line position shown except when a solenoid 37 is energized. This solenoid is mounted on an arm 38 on the bar 18 and, when energized, pulls on an arm 39 on the lever 25 to hold the pawl in operative position against the force of the spring 32.

The solenoid 37 is energized from a power source 40 through a circuit 41 which includes a switch 43. The latter is in a position to be engaged and closed by the pilot's power control lever 45 when the latter is in a selected power position, as in the take-off position shown. Thus, during take-off the solenoid 37 is energized and holds the pawl in operative position.

A solenoid 47 for the valve 4 may have its armature 49 connected directly to the valve, as shown, with the valve held in the normal position shown by a coil spring 51. An electrical circuit 53 includes a source of power 55 and the solenoid 47 and is controlled by a switch 57 held in the open position by a relay 59. The relay 59 also controls another switch 61 in a circuit 63 which has a source of power 65. This circuit 63 also includes a switch 67 the movable arm 69 of which is in a position to be engaged by a lever 71 pivoted as on the pin 73 on the slide 28 and held in the position shown by a spring 75.

In the event of a sudden decrease in torque delivered by the power plant the bar 18 moves to the left carrying with it the slide 28 and causing the lever 71 to open the switch 67 thereby de-energizing the relay 59 to open the switch 61 and close the switch 57. With the switch 57 closed the solenoid 47 is energized and the fuel is supplied to the emergency fuel system through conduit 9. The lever 71 may carry a set screw 76 by which to adjust the position of the lever with respect to the switch arm 69. By this arrangement it is possible to select the amount of torque decrease necessary to open switch 67 so that the slight torque variations occurring in normal operation will not be effective on the switch-over system.

The control may include a signal in the form of an indicating light 77 in a branch circuit 79 so arranged that the light is in parallel with the relay 59 and will be lighted when the relay 59 is energized, thus indicating that the switch-over control is ready for operation. The control may also include an arming switch 81 which is in a circuit such that the switch 81 is in parallel with the switch 61. With this arrangement, after the emergency switch-over control has operated to release switch 61 the control may be re-armed for use again by depressing the switch 81, which closes the circuit 63 through the relay 57 so that the switch 61 will be closed and the switch 57 open. The opening of switch 57 allows the valve 4 to return to normal position for supplying fuel to the main fuel system.

It is to be understood that the invention is not limited to the specific embodiment herein illustrated and described, but may be used in other ways without departure from its spirit as defined by the following claims.

I claim:

1. A control for a fuel system for an aircraft gas turbine power plant having power absorbing means, including a main fuel system, an emergency fuel system, a source of fuel under pressure for supplying fuel to said systems, and means responsive to a substantial decrease in power plant torque resulting from a failure of said main system for automatically rendering operative said emergency system.

2. A control for a fuel system for an aircraft gas turbine power plant having power absorbing means, including a main fuel system and an emergency fuel system, and a source of fuel under pressure for supplying fuel to either of said systems, in combination with a valve for directing fuel selectively to either of said systems, and means responsive to a substantial reduction in power plant torque resulting from a failure of the main fuel system for shifting said valve into a position to supply fuel to said emergency system.

3. A control for a fuel system for a propeller-equipped, aircraft gas turbine power plant, including a main fuel system and an emergency fuel system, in combination with power plant torque responsive means, and a control system including means responsive to said torque responsive means for shifting from said main system to said emergency system.

4. A control for a fuel system for a propeller-equipped, aircraft gas turbine power plant, including a main fuel system and an emergency fuel system, in combination with power plant torque responsive means, and a control system responsive to said torque responsive means and operative upon a substantial decrease in said torque for switching from said main system to said emergency system.

5. A control for a fuel system for an aircraft gas turbine power plant having power absorbing means, said system including a main fuel system and an emergency fuel system, in combination with power plant torque responsive means, a control system including means responsive to said torque responsive means for shifting from said main system to said emergency system, and means operative during maximum power operation of said power plant for rendering operative said control system.

6. A control for a fuel system for an aircraft gas turbine power plant having a variable pitch propeller, said system including a main fuel system and an emergency fuel system, in combination with power plant torque responsive means, a control system responsive to said torque responsive means and operative upon a substantial decrease in torque for switching from said main system to said emergency system, and means operative during maximum power operation of said power plant for rendering operative said control system.

7. A control for a fuel system for an aircraft gas turbine power plant having a variable pitch propeller, said system including a main fuel system and an emergency fuel system, in combination with power plant torque responsive means, a control system including means responsive to said torque responsive means for shifting from said main system to said emergency system, a power control for said power plant, and means responsive to movement of said power control into a predetermined position for rendering operative said control system.

8. A control for a fuel system for an aircraft gas turbine power plant having power absorbing means, said system including a main fuel system and an emergency fuel system, in combination with power plant torque responsive means, a control system responsive to said torque responsive means and operative upon a substantial decrease in said torque for switching from said main system to said emergency system, a power control for said power plant, and means responsive to movement of said power control into maximum power position for rendering operative said control system.

9. A control for a fuel system for an aircraft gas turbine power plant having power absorbing means, said system including a main fuel system and an emergency fuel system, said fuel systems being arranged in parallel for selective operation, a source of fuel under pressure for said systems, and a valve for directing fuel selectively to one or the other of said systems, in combination with power plant torque responsive means and control means responsive to said torque responsive means for causing movement of said valve into a position for directing fuel to the emergency system in the event of a substantial decrease in torque.

10. A control for a fuel system for an aircraft gas turbine power plant having power absorbing means, said system including a main fuel system and an emergency fuel system, said fuel systems being arranged in parallel for selective operation, a source of fuel under pressure for said systems, and a valve for directing fuel selectively to one or the other of said systems, in combination with power plant torque responsive means, control means responsive to said torque responsive means for causing movement of said valve into a position for directing fuel to the emergency system in the event of a substantial decrease in torque, a power control lever and means operative when said lever is in a predetermined position for activating the control means.

References Cited in the file of this patent

UNITED STATES PATENTS

| | | |
|---|---|---|
| 2,596,815 | Keil | May 13, 1952 |
| 2,598,674 | Burgess | June 3, 1952 |
| 2,639,584 | Schorn | May 26, 1953 |
| 2,649,906 | Neal et al. | Aug. 25, 1953 |